United States Patent
MacDonald et al.

(10) Patent No.: US 12,459,863 B2
(45) Date of Patent: Nov. 4, 2025

(54) ACTIVATED GLASS POZZOLAN

(71) Applicant: Glass Processing Solutions, LLC, Richfield Springs, NY (US)

(72) Inventors: Kevin MacDonald, Mendota Heights, MN (US); Mary Christiansen, Mendota Heights, MN (US)

(73) Assignee: Glass Processing Solutions LLC, Richfield Springs, NY (US)

( * ) Notice: Subject to any disclaimer, the term of this patent is extended or adjusted under 35 U.S.C. 154(b) by 0 days.

(21) Appl. No.: 18/374,498

(22) Filed: Sep. 28, 2023

(65) Prior Publication Data

US 2024/0018040 A1 Jan. 18, 2024

Related U.S. Application Data

(60) Continuation of application No. 18/196,374, filed on May 11, 2023, which is a division of application No. 16/756,315, filed as application No. PCT/US2018/056128 on Oct. 16, 2018.

(60) Provisional application No. 62/574,129, filed on Oct. 18, 2017.

(51) Int. Cl.
  *C03C 15/00* (2006.01)
  *C04B 14/22* (2006.01)
  *C04B 14/28* (2006.01)
  *C04B 18/04* (2006.01)
  *C04B 28/04* (2006.01)
  *C04B 103/00* (2006.01)

(52) U.S. Cl.
  CPC .............. *C04B 14/22* (2013.01); *C03C 15/00* (2013.01); *C04B 14/28* (2013.01); *C04B 18/0481* (2013.01); *C04B 28/04* (2013.01); *C04B 2103/0088* (2013.01)

(58) Field of Classification Search
  CPC ..... C04B 14/22; C04B 14/28; C04B 18/0481; C04B 28/04; C04B 2103/0088; C04B 18/04; C04B 18/00; C04B 28/26; C04B 20/023; C04B 20/026; C04B 20/008; C03C 15/00
  USPC .......................... 106/711, 716, 737, 709, 814
  See application file for complete search history.

(56) References Cited

U.S. PATENT DOCUMENTS

| | | | |
|---|---|---|---|
| 2,337,460 A | 12/1943 | French | |
| 6,296,699 B1 | 10/2001 | Jin | |
| 2006/0240967 A1* | 10/2006 | Hojaji | C04B 28/02 428/432 |
| 2009/0283018 A1 | 11/2009 | Grasso, Jr. | |
| 2014/0261088 A1 | 9/2014 | Bullerjhan | |
| 2016/0009594 A1* | 1/2016 | Soroushian | C04B 28/04 106/789 |

FOREIGN PATENT DOCUMENTS

| | | |
|---|---|---|
| WO | 2016107936 | 7/2016 |
| WO | 2019/079333 A1 | 4/2019 |

OTHER PUBLICATIONS

H Maraghechi, M Maraghechi, F Rajabipour, C Pantano, Pozzolanic reactivity of recycled glass powder at elevated temperatures: Reaction stoichiometry, reaction products and effect of alkali activation, Cement and Concrete Composites, 2014 (53), 105-114. DOI: 10.1016/j.cemconcomp.2014.06.015. (Year: 2014).*
Saeed, Huda & Ebead, Usama & Tagnit-Hamou, A. & Neale, Kenneth. (2012). Stoichiometric study of activated glass powder hydration. Advances in cement research. 24. 91-101. DOI: 10.1680/adcr.10.00067. (Year: 2012).*
Yoshimura, Masahiro & Byrappa, Kullaiah. (2007). Hydrothermal Processing of Materials: Past, Present and Future. Journal of Materials Science. 43. 2085-2103. DOI: 10.1007/s10853-007-1853-x. (Year: 2007).*
L. M. Federico, S.E. Chidiac, Waste glass as a supplementary cementitious material in concrete—Critical review of treatment methods, Cement and Concrete Composites, 31(2009) 8, 606-610. DOI: 10.1016/j.cemconcomp.2009.02.001. (Year: 2009).*
PCT International Search Report and Written Opinion, Jan. 24, 2019.
V.D. Kazakova Achievements in the Sphere of Development and Improvement of the Methods of Glass Strengthering, Moscow, 1978 (Russian reference) Relevance disclosed in PCT International Search Report and Written Opinion, Jan. 24, 2019.
Torres J. J. et al; "Alkaline Chemical Activation of Urban Glass Wastes to produce Cementitious Materials", 1st Spanish National Conference on Advances in Materials Recycling and Eco—Energy Madrid, Nov. 12-13, 2009, pp. 111 to 114.
Saeed H A et al; "Stoichiometric Study of Activated Glass Powder Hydration" Advances in Chemical Research, vol. 24, Issue 2, pp. 91-101.
John Eliasson. Sand Media Specifications (2002). [Retrieved from internet at Jul. 8, 2022 from <URL:https://doh.wa.gov/sites/default/files/legacy/Documents/Pubs//337-104.pdf>]. (Year: 2002).
Millipore Sigma (2016) Calcium hydroxide [retrieved from internet at Jul. 12, 2022 from <URL: https://www.emdmillipore.com/US/en/product/Calcium-hydroxide,MDA_CHEM-10204?#anchor_Description>] (Year: 2016).

* cited by examiner

*Primary Examiner* — Amber R Orlando
*Assistant Examiner* — Marites A Guino-O Uzzle
(74) *Attorney, Agent, or Firm* — K&L Gates LLP; Brian J. Novak; David W. Old

(57) ABSTRACT

Described herein are processes for the activation of glass pozzolan as well as the activated product. Methods of using the activated product are also described.

12 Claims, No Drawings

ACTIVATED GLASS POZZOLAN

CROSS REFERENCE TO RELATED APPLICATIONS

This application is continuation of U.S. patent application Ser. No. 18/196,374, filed May 11, 2023, which is a divisional application of U.S. patent application Ser. No. 16/756,315, filed Apr. 15, 2020, which is a national phase of PCT/US2018/056128, filed Oct. 16, 2018, which claims the benefit of U.S. Provisional Patent Application No. 62/574,129, filed Oct. 18, 2017, the entire disclosure each of which is incorporated herein by reference.

FIELD

Described herein generally are activated glass pozzolan, methods of making same, and methods of using same.

SUMMARY

Described herein generally are activated glass pozzolans, methods of making these activated glass pozzolans, and methods of using them.

In one embodiment, an activated glass pozzolan can include particles of activated glass including etched surfaces, microcrystalline calcium silicate hydrate (C—S—H), and calcium carbonate. In some embodiments, the glass is soda lime glass, bottle glass, plate glass, or e-glass. In some embodiments, the glass is soda lime glass, bottle glass, plate glass, e-glass, or a combination thereof. In some embodiments, the glass is at least partially recycled. In some embodiments, the glass is ground glass.

In some embodiments, the particles have a diameter of about 1 μm to about 100 μm. In some embodiments, 90% of particles fall through a 45 μm screen or 85% of particles fall through a 45 μm screen. The particles can have a 2-3 coefficient of uniformity.

Methods of forming an activated glass pozzolan are also described. In some embodiments, the methods can include reacting particles of glass in an activation solution including Group IA, Group IIA, or Group VI IB metal or metal hydroxide to form the activated glass pozzolan, wherein the reacting is at an elevated pH, an elevated temperature, and an elevated pressure.

In some embodiments, the metal can include sodium, potassium, calcium, magnesium, or manganese.

In some embodiments, the activated glass pozzolan is ground to a particle size of between about 1 μm and about 100 μm.

In some embodiments, the elevated temperature is between about 100° C. and about 220° C.

In some embodiments, the elevated pH is greater than 11.

In some embodiments, the methods can further include circulating the particles of glass and the activation solution. In some embodiments, the circulating is at a rate of about 10 RPM to about 500 RPM.

In some embodiments, the methods can further include exposing the activation solution to air.

DETAILED DESCRIPTION

Described herein are processes for the activation of glass pozzolan as well as the activated product. Methods of using the activated product are also described. The activation of the glass pozzolan can serve to increase the reactivity of the glass pozzolan material with cement and water. In some embodiments, the activated product and cement form silicate and aluminate hydrates when mixed with water.

The production of portland cement, which is the most commonly used cement in the world, releases approximately 0.88 tons of $CO_2$ per ton of cement produced (EPA 2015), and is estimated to be responsible for 5-8% of global anthropogenic carbon emissions annually. In embodiments described herein, by replacing portions of portland cement in concrete with an activated glass pozzolan, significant greenhouse gas emission reductions can be achieved.

In addition, in some embodiments, incorporation of an activated glass pozzolan can also significantly improve the durability of concrete products, thereby saving time, energy, materials, maintenance, and replacement costs over the life of the concrete product.

Currently, fly ash and slag are the two most commonly used types of pozzolans. A pozzolan is a term given to a material that, when combined with portland cement and water, becomes cementitious. A majority of ready mixed concrete produced in the United States contains some fraction of fly ash or slag pozzolan. Ground glass as used herein, as a commonly used consumer product, offers wider geographic availability than fly ash, which must be transported from electric power plants, or slag, which is only available where iron or steel is manufactured.

In some embodiments, ground glass as used herein offers a more consistent chemical composition than fly ash, which can vary significantly from source to source. This consistent composition can be important in the manufacture of concrete products, as reliability and reproducibility are held paramount within the industry; the prediction of material performance is important to life safety when building products are concerned.

The glass used to form the activated product can be any form of glass. In some embodiments, the glass is soda lime glass. The glass used can include bottle glass, plate glass, e-glass, or any other natural or synthetically made amorphous silica that is activated by partial dissolution at elevated pH. In some embodiments, the glass is recycled or at least partially recycled.

In one embodiment, the glass used is glass fines from a recycling facility that would normally be destined for a landfill. In other words, the glass used can prevent sending waste to a landfill.

The raw glass product can be cleaned, sterilized, ground, and dried as necessary to begin activation of a glass pozzolan. In some embodiments, the ground glass can be intermediate sized ground glass. The activation includes partial glass dissolution in an activation solution and subsequent reactions to provide a pozzolan that, with or without further grinding, will achieve a higher early strength than glass that has not undergone this treatment.

Processing of the glass may be performed before or after grinding. In some embodiments, the same performance is provided whether the processing is performed before or after grinding. In some embodiments, a similar performance is provided whether the processing is performed before or after grinding.

The activation solution can include calcium hydroxide and/or sodium acetate with an additive. The additive can be included to reduce the potential for alkali-silica reaction (ASR) at the time of grinding. Such chemicals may be organic or inorganic in nature, including, but not limited to, lithium salts, lithium hydroxide, or other proprietary materials made for the purpose of ASR suppression.

The activation solution can include any Group IA or Group IIA metal or metal hydroxide. In some embodiments, the metal can include sodium, potassium, calcium, or magnesium. In some embodiments, the metal can also be a Group VIIB metal such as manganese.

In some embodiments, the glass is reacted in the activation solution at an elevated temperature. The elevated activation temperature can range from about 20° C. to about 225° C., about 40° C. to about 220° C., about 20° C. to about 215° C., about 40° C. to about 215° C., about 150° C. to about 220° C., about 200° C. to about 220° C., about 200° C. to about 215° C., about 100° C. to about 200° C., about 150° C. to about 200° C., or about 100° C. to about 220° C. In one embodiment, the elevated temperature is between about 20° C. to about 212° C.

In some embodiment, the activation solution can be at a basic pH. The basic pH can be a pH greater than 7, a pH greater than 11, a pH between 7 and 14, a pH between 10 and 14, a pH between 7 and 10, a pH between 9 and 13, a pH between 8 and 12, or a pH between 10 and 12. In some embodiments, the treatment solution can have a pH greater than 11.

In some embodiments, the activation can include treating the glass at elevated pressure. In some embodiments, the elevated pressure is a pressure above 1 atm.

The temperature and the retention time in the pre-reaction vessels may vary depending on the particle size of the raw feed material to be activated, the pH of the solution, and the rate of relative movement of the solution past the surface that is being treated.

In some embodiments, the activation can at least partially dissolve silicon dioxide. In some embodiments, the silicon dioxide is soluble in the solution. In some embodiments, the activation can at least partially etch glass surfaces. In some embodiments, the activation can form microcrystalline calcium silicate hydrate (C—S—H) and calcium carbonate. In some embodiments, the activation can create nucleation sites during the reaction with cement. In some embodiments, the activation can at least partially dissolve soluble silicon dioxide, can at least partially etch glass surfaces, and can form microcrystalline C-S-H and calcium carbonate.

In some embodiments, the etching of the glass provides an increased reaction surface area which can allow an enhanced formation of microcrystalline C-S-H and calcium carbonate. Further, the etching and partial dissolution of the glass can increase glass' rate of reaction with cement.

In some embodiments, the activation mixture can be circulated, e.g., mixed, to prevent the development of a concentration gradient within the mixture. Circulation can occur at a rate of about 10 RPM to about 500 RPM, about 100 RPM to about 500 RPM, about 10 RPM to about 50 RPM, about 50 RPM to about 100 RPM, or about 20 RPM to about 100 RPM.

In some embodiments, the activation mixture can be exposed to air during mixing. This air exposure during mixing, can fix carbon dioxide from the air to manufacture nucleation sites. This does not affect the reaction thermodynamics, but can affect kinetics.

After the activation reaction is completed, the treated glass is subsequently dried. The dried activated glass can be ground to a particular particle size. The particle size can vary depending on the application for the activated glass. In some embodiments, the particle size is small enough to create a fine powder. In some embodiments, the particle size can be about 45 μm. In other embodiments, the particle size can be between about 40 μm and about 50 μm, about μm and about 60 μm, about 20 μm and about 70 μm, about 10 μm and about 80 μm, or about 1 μm and about 100 μm.

In some embodiments, the particle size can be wherein percentage of particles passes through a 45 μm screen. In some embodiments, that percentage is between about 80% and about 100%, about 85% and about 100%, about 90% and about 100%, or about 95% and about 100%. In one embodiment, 85% of particles fall through a 45 μm screen. In another embodiment, 90% of particles fall through a 45 μm screen.

In some embodiments, the particles have a 2-3 coefficient of uniformity.

The reacted material, after final grinding, can have a particle size that is small enough that the early age and long term expansion tests, such as ASTM C1260/ASTM C1567, and ASTM C1293, show reduced expansion over plain portland cement control samples.

In some embodiments, the particle size is chosen such that reaction is rapid and the pozzolanic reaction is favored at the cost of the reaction between alkalis, such as sodium and potassium, and the silica in glass or in other materials which may be added to the binder to create concrete. The particle size is important relative only to the degree of reaction and rate of reaction.

In some embodiments, the activated material can be added to cement. In some embodiments, this addition can offset environmental impacts, such as, but not limited to, carbon dioxide emissions. The cement can be portland cement, which is the most common cement used globally.

Portland cement generally reacts with water according to the reaction to form C—S—H and calcium hydroxide.

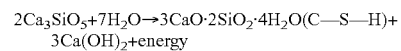

$$2Ca_3SiO_5 + 7H_2O \rightarrow 3CaO \cdot 2SiO_2 \cdot 4H_2O(C\text{—}S\text{—}H) + 3Ca(OH)_2 + energy$$

The activated material described herein can react with the calcium hydroxide to produce additional C—S—H. This additional C—S—H can fill pores and result in a lower binder permeability and stronger concrete.

The activated material can be of further benefit because its reaction with the calcium hydroxide can reduce the calcium hydroxide content in the final concrete material. Reduced calcium hydroxide content can help prevent expansive reactions and reduces the ingress of harmful chlorine and carbonate ions.

The activated material can also reduce permeability and porosity of the concrete, and/or decrease the heat of hydration.

The activated material can be combined in binary, ternary, quaternary, and quinternary mixtures. The activated material can be combined with other pozzolanic materials such as, but not limited to, fly ash, metakaolin, silica fume, rice husk ash, volcanic ash, pumices, volcanic glass, zeolites, diatomaceous earths, and the like. Thus, products including the herein described activated materials are described.

In some embodiments, a cement material is described that includes portland cement and the activated material. In some embodiments, the cement material can include about 20-30% portland cement and about 70-80% activated material, about 30-40% portland cement and about 60-70% activated material, about 40-50% portland cement and about 50-60% activated material, about 50-60% portland cement and about 40-50% activated material, about 60-70% portland cement and about 30-40% activated material, about 70-80% portland cement and about activated material, or about 80-90% portland cement and about 10-20% activated material.

In other embodiments, the cement material can include portland cement, the activated material, and at least one additional pozzolanic material. In some embodiments, the cement material can include about 70-80% activated material, about 60-70% activated material, about activated material, about 40-50% activated material, about 30-40% activated material, about 20-30% activated material, or about 10-20% activated material.

In still other embodiments, the cement material can include portland cement, the activated material, and at least two additional pozzolanic materials. In still other embodiments, the cement material can include portland cement, the activated material, and at least three additional pozzolanic materials. In still other embodiments, the cement material can include portland cement, the activated material, and at least four additional pozzolanic materials. In still other embodiments, the cement material can include portland cement, the activated material, and at least five additional pozzolanic materials. In still other embodiments, the cement material can include portland cement, the activated material, and at least six additional pozzolanic materials.

Further, mixing the activated material with cement, such as portland cement, and optionally at least one additional pozzolanic material is water reducing. The mixing is water reducing because the quantity of water required to produce a particular flow is reduced over that of a unitary portland cement mixture.

Further, in some embodiments, because the activated material includes C—S—H, when blended with portland cement, the amount of portland cement required to achieve an equivalent concentration of C—S—H in the final concrete is reduced. This reduction in the amount of portland cement needed greatly reduces the amount of greenhouse gas equivalents. For instance, great amounts of energy are expended in mining the limestone for portland cement and heating the limestone. Further, carbon dioxide is produced when heating calcium carbonate to form calcium oxide. In some embodiments, for every mole of C—S—H that is provided by the activated material, 2 mole equivalents of portland cement can be eliminated as can the greenhouse gas equivalents used in making that portland cement.

The activated glass pozzolan described herein can provide a reduction in $MTCO_2e$ when replacing an equivalent amount of portland cement in a mixture. In some embodiments, the activated glass pozzolan can provide about a 10% to about a 99% reduction, about a 20% to about a 99% reduction, about a 30% to about a 99% reduction, about a 40% to about a 99% reduction, about a 50% to about a 99% reduction, about a 60% to about a 99% reduction, about a 70% to about a 99% reduction, about a 80% to about a 99% reduction, about a 90% to about a 99% reduction, about a 92% to about a 97% reduction in $MTCO_2e$ when replacing an equivalent amount of portland cement in a mixture. In one embodiment, the activated glass pozzolan can provide about a 95% reduction in $MTCO_2e$ when replacing an equivalent amount of portland cement in a mixture.

In some embodiments, concrete including and/or poured with the activated glass pozzolan can be stronger than portland cement alone within about 24 hours. In other embodiments, concrete including and/or poured with the activated glass pozzolan can be stronger than portland cement alone within about 7 days. In other embodiments, concrete including and/or poured with the activated glass pozzolan can be stronger than portland cement alone within about 28 days. In other embodiments, the concrete including and/or poured with the activated glass pozzolan can be about 75% to about 110% stronger, about 80% to about 110% stronger, about 90% to about 110% stronger, about 95% to about 110% stronger, or about 75% to about 120% stronger.

In some embodiments, concrete including and/or poured with the activated glass pozzolan can be stronger than portland cement with another other pozzolanic material within about 24 hours. In other embodiments, concrete including and/or poured with the activated glass pozzolan can be stronger than portland cement with another other pozzolanic material within about 7 days. In other embodiments, concrete including and/or poured with the activated glass pozzolan can be stronger than portland cement with another other pozzolanic material within about 28 days. In other embodiments, the concrete including and/or poured with the activated glass pozzolan can be about 75% to about 110% stronger, about 80% to about 110% stronger, about 90% to about 110% stronger, about 95% to about 110% stronger, or about 75% to about 120% stronger.

Example 1

Preparation of Activated Material

Recycled glass are diverted from delivery to a landfill and provided to an activation facility. The glass is ground, sanitized, dried, and ground again. That material is added to a reaction vessel with an activation solution at a pH greater than about 11 including calcium hydroxide with a lithium salt and/or lithium hydroxide to form a mixture. That mixture is stirred and subjected to air while stirring. The reaction vessel is heated to a temperature between about 150° C. to about 220° C. and subjected to an elevated pressure. When reaction is complete, the activated material is dried.

Example 2

Mixing Activated Material with Portland Cement

The activated material from Example 1 is mixed with portland cement at a 1:1 ratio. Water and aggregate is added to that mixture and the resulting concrete is stronger than a portland cement only concrete.

Example 3

Green House Gas (GHG) Emission Reduction Calculation

Since glass fines reused in the present description are not suitable for making new glass and have no other market value, they are sent to a landfill, meaning a closed loop recycling plan for glass fines is not possible. For this reason, the straightforward CARB Greenhouse Gas Reduction Calculator cannot be used.

In order to calculate the greenhouse gas emission reductions from the addition of activated material from Example 1, a lifecycle approach consistent with the California Air Resources Board's (CARB) Method for Estimating GHG Emissions Reductions from Recycling guide is used in conjunction with the Environmental Protection Agency's (EPA) Waste Reduction Model (WARM) Version 13.

Since the activated glass pozzolan eventually takes the place of a percentage of portland cement in concrete, both the GHG emissions for the activated glass pozzolan and portland cement must be calculated and compared, as shown in Equation 1. Definitions of the variables in Equation 1 are provided in Table 1.

$$GHG_{net} = GHG_{PC} - GHG_{AGP} \hspace{2cm} \text{(Equation 1)}$$

TABLE 1

| Variable | Definition | Units |
|---|---|---|
| $GHG_{net}$ | net difference in greenhouse gas emissions between the production of the activated glass pozzolan and portland cement | Tons of $CO_2$ |
| $GHG_{PC}$ | total greenhouse gas emissions from the production of one ton of portland cement made from virgin materials | Tons of $CO_2$/tons produced |
| $GHG_{AGP}$ | total greenhouse gas emissions from the production of one ton of activated glass pozzolan (AGP) | Tons of $CO_2$/tons produced |

Calculation of $GHG_{PC}$

Production of portland cement (PC) begins with the mining of raw materials, typically limestone, clay and shale. These materials are transported to a processing facility where they are ground down to fine powders and analyzed for composition. The materials, at this point called raw meal, are blended based on composition and sent to a cement kiln. In some cases the raw meal is preheated in a precalciner or a flash furnace, other times it just goes directly to the kiln. The internal temperature of a cement kiln is approximately 2000° C. The cement kiln is cylindrical in shape, elevated at a slight angle on one end, with an internal flame at the other end. The raw meal is moved slowly through the kiln through subtle rotation, and as the temperature increases a series of chemical reactions occur. Once the materials, now in the form of a nodule called clinker, reach a temperature of 1450° C., they are rapidly cooled. The cooled clinker is then interground with calcium sulfate dihydrate, or gypsum, and the resulting product is portland cement.

There are three main types of carbon emissions associated with the production of portland cement: (1) process energy GHG emissions, (2) non-process energy GHG emissions, and (3) transportation energy emissions. The total GHG emissions can be calculated as the sum of these three sources, as shown in Equation 2. The variables are defined in Table 2.

$$GHG_{PC} = GHG_{PE} + GHG_{NPE} + GHG_{TE} \quad \text{(Equation 2)}$$

TABLE 2

| Variable | Definition | Units |
|---|---|---|
| $GHG_{PE}$ | Process energy GHG emissions | Tons of $CO_2$/ton of portland cement produced |
| $GHG_{NPE}$ | Non-process energy GHG emissions | Tons of $CO_2$/ton of portland cement produced |
| $GHG_{TE}$ | Transportation energy emissions | Tons of $CO_2$/ton of portland cement produced |

In some embodiments, process energy GHG emissions can include burning of fossil fuels to heat the kiln and emissions associated with grinding the raw meal and clinker. Non-process energy GHG emissions can come from a single source. When limestone, or calcium carbonate ($CaCO_3$), which is the primary raw material in portland cement production, is heated past 825° C., a natural calcination reaction occurs, where $CO_2$ is released, leaving behind lime, or CaO.

Transportation energy emissions are those emissions associated with the transportation of the materials during the portland cement production process (i.e. raw materials from the mine to the processor and then to the kiln). The values for each of these emission types, as reported by the EPA WARM Report for Fly Ash, for portland cement production, are shown in Table 3.

TABLE 3

| Emission Source | ($MTCO_2$/ton) |
|---|---|
| Process Energy, $GHG_{PE}$ | 0.42 |
| Non-process Energy, $GHG_{NPE}$ | 0.45 |
| Transportation Energy, $GHG_{TE}$ | 0.01 |
| Total | 0.88 |

Calculation of $GHG_{AGP}$

A life-cycle GHG analysis in WARM starts at the waste generation reference point of fly ash and only considers upstream emissions after that point. In this case, the waste generation reference point is identified as the point at which the fines have been collected and are marked for the landfill. Emissions associated with glass production, collection, and processing up to this point are not considered in these calculations, nor are the emissions associated with transporting the fines to a processing plant, because it is assumed these emissions cancel out with the emissions that would have occurred if the fines had been transported to the landfill.

The processes that occur in a processing plant include an initial grinding process, a sanitization treatment process, a drying process, and a final grind. All of these processes are run on electricity. Therefore, the following calculations are used to determine the total energy requirement (in kWh) to produce one ton of activated glass pozzolan for each process. The kilowatt-hours were then converted to tons of CO2e produced using a conversion provided by the EPA. According to the eGRID (Emissions and Resources Integrated Database), the conversion for the WECC (Western Electricity Coordinating Council) in California is 1 kWh=0.5705 lb $CO_2$e (US EPA 2017). The formula used to calculate $GHG_{AGP}$ is provided in Equation 4 and the definitions of the variables are shown in Table 4.

$$GHG_{SGP} = GHG_{G1} + GHG_{treat} + GHG_{dry} + GHG_{G2} \quad \text{(Equation 4)}$$

TABLE 4

| Variable | Definition | Units |
| --- | --- | --- |
| $GHG_{G1}$ | Initial grinding of one ton of material | lb of $CO_2$/ton produced |
| $GHG_{treat}$ | Sanitizing treatment of one ton of material | lb of $CO_2$/ton produced |
| $GHG_{dry}$ | Removing moisture from one ton of material | lb of $CO_2$/ton produced |
| $GHG_{G2}$ | Final grinding of one ton of material | lb of $CO_2$/ton produced |

Using the methods described herein, values are aggregated and summed in Table 5. The total GHG emissions associated with the production of one ton of activated glass pozzolan is about 0.046 metric tons of $CO_2e$.

TABLE 5

| Emission Source | (lb $CO_2e$/ton) | ($MTCO_2e$/ton) |
| --- | --- | --- |
| Initial Grinding, $GHG_{G1}$ | 1.7 | 0.00077 |
| Sanitization Treatment, $GHG_{treat}$ | 17.3 | 0.00785 |
| Drying, $GHG_{dry}$ | 74.2 | 0.03366 |
| Final Grinding, $GHG_{G2}$ | 8.5 | 0.00386 |
| Total | 101.7 | 0.046 |

Calculation of $GHG_{NET}$

Both the process for the production of activated glass pozzolan and the production of portland cement likely include a transportation-based GHG emission when the material is transported from the manufacturer to the concrete manufacturer. This transportation emission is not included in these calculations, as it assumed that these emissions would be nearly equal.

Therefore, according to Equation 1, the net GHG emission reductions when comparing one metric ton of activated glass pozzolan to one ton of portland cement can be calculated to be:

$$GHG_{NET} = 0.88 - 0.046 = 0.834$$

Further, based on the projected production of 40,000 tons of activated glass pozzolan per year per facility, the net impact can be a GHG emission reduction of 33,360 tons of $MTCO_2e$ annually per facility.

While the invention has been particularly shown and described with reference to particular embodiments, it will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

Unless otherwise indicated, all numbers expressing quantities of ingredients, properties such as molecular weight, reaction conditions, and so forth used in the specification and claims are to be understood as being modified in all instances by the term "about." Accordingly, unless indicated to the contrary, the numerical parameters set forth in the specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

The terms "a," "an," "the" and similar referents used in the context of describing the invention (especially in the context of the following claims) are to be construed to cover both the singular and the plural, unless otherwise indicated herein or clearly contradicted by context. Recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member may be referred to and claimed individually or in any combination with other members of the group or other elements found herein. It is anticipated that one or more members of a group may be included in, or deleted from, a group for reasons of convenience and/or patentability. When any such inclusion or deletion occurs, the specification is deemed to contain the group as modified thus fulfilling the written description of all Markush groups used in the appended claims.

Certain embodiments of this invention are described herein, including the best mode known to the inventors for carrying out the invention. Of course, variations on these described embodiments will become apparent to those of ordinary skill in the art upon reading the foregoing description. The inventor expects skilled artisans to employ such variations as appropriate, and the inventors intend for the invention to be practiced otherwise than specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

Furthermore, numerous references have been made to patents and printed publications throughout this specification. Each of the above-cited references and printed publications are individually incorporated herein by reference in their entirety.

In closing, it is to be understood that the embodiments of the invention disclosed herein are illustrative of the principles of the present invention. Other modifications that may be employed are within the scope of the invention. Thus, by way of example, but not of limitation, alternative configurations of the present invention may be utilized in accordance with the teachings herein. Accordingly, the present invention is not limited to that precisely as shown and described.

We claim:

1. A method of forming an activated glass pozzolan, the method including:
   reacting particles of glass in an activation solution including sodium, potassium, calcium, magnesium or manganese metal or metal hydroxide, wherein the activation solution further consists of an additive selected from lithium salts or lithium hydroxide;
   wherein the activation reaction provides partially etched glass with calcium silicate hydrate (C—S—H) therein;
   wherein the partially etched glass is subsequently dried after the activation reaction is completed; and
   optionally grinding the dried partially etched glass with C—S—H therein;
   thereby providing an activated glass pozzolan.

2. The method of claim 1, wherein the particles of glass are soda lime glass, bottle glass, plate glass, e-glass, or a combination thereof.

3. The method of claim 1, wherein the particles of glass are soda lime glass, bottle glass, plate glass, or e-glass.

4. The method of claim 1, wherein the particles of glass are at least partially recycled.

5. The method of claim 1, wherein the particles of glass are substantially all recycled.

6. The method of claim 1, wherein the activated glass pozzolan is ground to a particle size of between about 1 μm and about 100 μm.

7. The method of claim 6, wherein the ground activated glass pozzolan has an expansion less than portland cement control samples.

8. The method of claim 1, further comprising circulating the particles of glass and the activation solution.

9. The method of claim 8, wherein the circulating is at a rate of about 10 RPM to about 500 RPM.

10. The method of claim 1, wherein during reacting particles of glass in an activation solution, the reaction is exposed to air.

11. The method of claim 1, further comprising adding the resulting activated glass pozzolan to cement.

12. The method of claim 1, wherein the activation solution includes calcium hydroxide.

* * * * *